D. D. HARDY.
Car-Starter.

No. 161,030

Patented March 23, 1875.

Witnesses
Clarence Thurlow
Albert Sartain

Dexter D. Hardy,
by E. Thurlow his Atty

UNITED STATES PATENT OFFICE.

DEXTER D. HARDY, OF DELAVAN, ILLINOIS, ASSIGNOR, BY MESNE ASSIGNMENTS, TO HIMSELF, CHARLES L. BOOTH, AND JOHN R. STONE, OF SAME PLACE.

IMPROVEMENT IN CAR-STARTERS.

Specification forming part of Letters Patent No. 161,030, dated March 23, 1875; application filed October 12, 1874.

*To all whom it may concern:*

Be it known that I, DEXTER D. HARDY, of Delavan, in the county of Tazewell, in the State of Illinois, have invented an Improvement in Implements for Moving Cars; and do hereby declare that the following is a full, clear, and exact description thereof, reference being had to the annexed drawings, making a part of this specification, in which like letters of reference refer to like parts, and in which—

Figure 1:
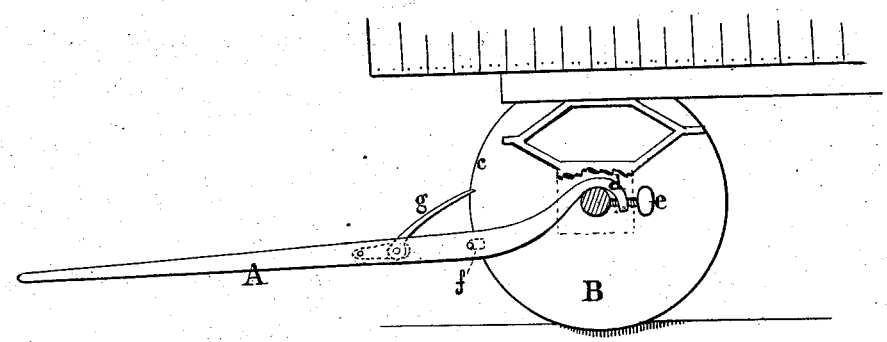
Figure 2:
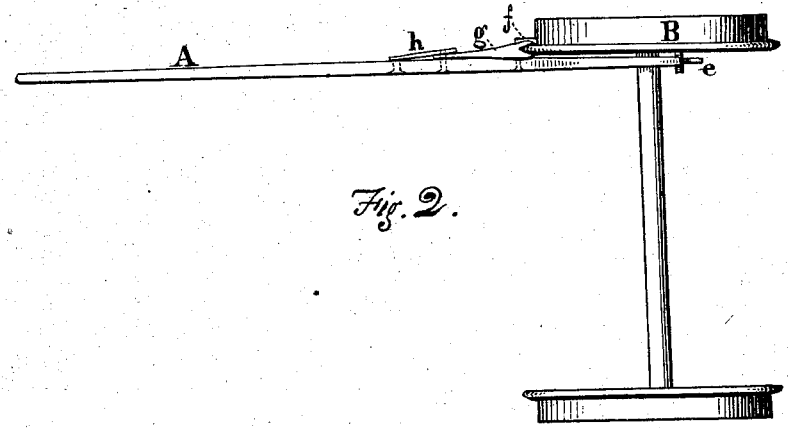

Figure 1 represents a side elevation of the same; Fig. 2, a plan of the same.

This invention consists of a lever having a curved fulcrum end or bearing, made adjustable to the car-axle by means of a screw or similar appliance, to regulate the distance between the bearing on the axle and the hook or lug on the lever, which clasps the flange of the wheel. Above this hook or lug, and a little behind it, is pivoted a forked pawl, so placed as to fall against and clasp said flange above the hook. The latter prevents the lever from moving laterally away from said flange during the upward pull on the lever by the operator in rotating the wheel.

In the drawings, A represents the lever; B, the car-wheel; c, its flange; d, the semicircular bearing on fulcrum of the lever; e, the adjusting-screw to draw the hook f up to its place in applying the lever to wheels of different sizes; f, the lug or hook which projects horizontally from that side of the lever which is next to the flange of the wheel, and embraces the latter to enable the pawl to work properly in keeping it in a line with said flange.

The operation of this lever is simple. The bearing d bridges the car-axle on the flanged side of the wheel, the adjusting-screw e being used to adjust the bearing to the axle in such a manner that the hook f embraces the flange. The pawl then falls against and embraces the latter above the hook f. An upward motion of the handle of the lever rotates the wheel by the gripe of the pawl.

What I claim as my invention is—

The combination of the lever A, having an adjustable fulcrum-bearing upon the axle of a car, the hook or lug f, and pawl g, substantially as described.

In testimony that I claim the foregoing implement for moving cars I have hereunto set my hand this 23d day of October, A. D. 1874.

DEXTER D. HARDY.

Witnesses:
JAMES M. MORSE,
HENRY W. WELLS.